July 4, 1967  G. A. BILOCQ  3,329,251
LONG LOG EJECTOR
Filed Jan. 6, 1966  3 Sheets-Sheet 1
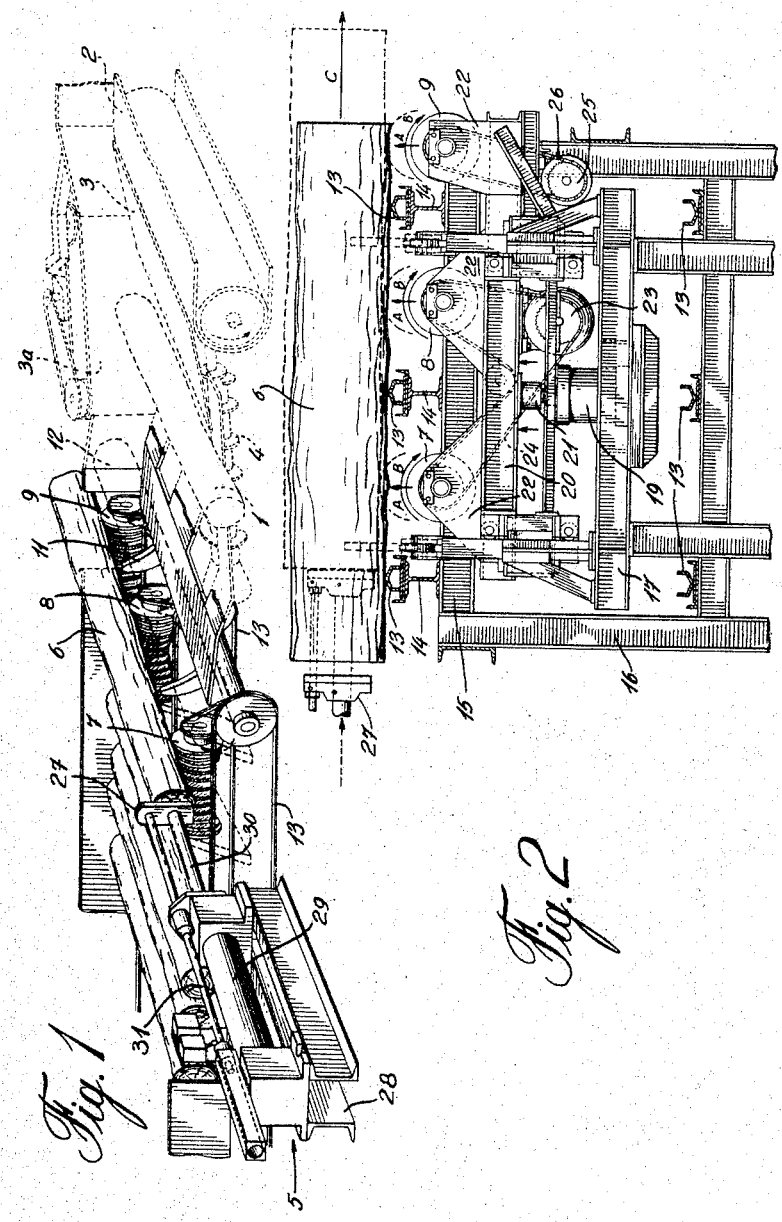
INVENTOR
Georges A. BILOCQ
BY
ATTORNEYS INVENTOR
Georges A. BILOCQ
BY
ATTORNEYS

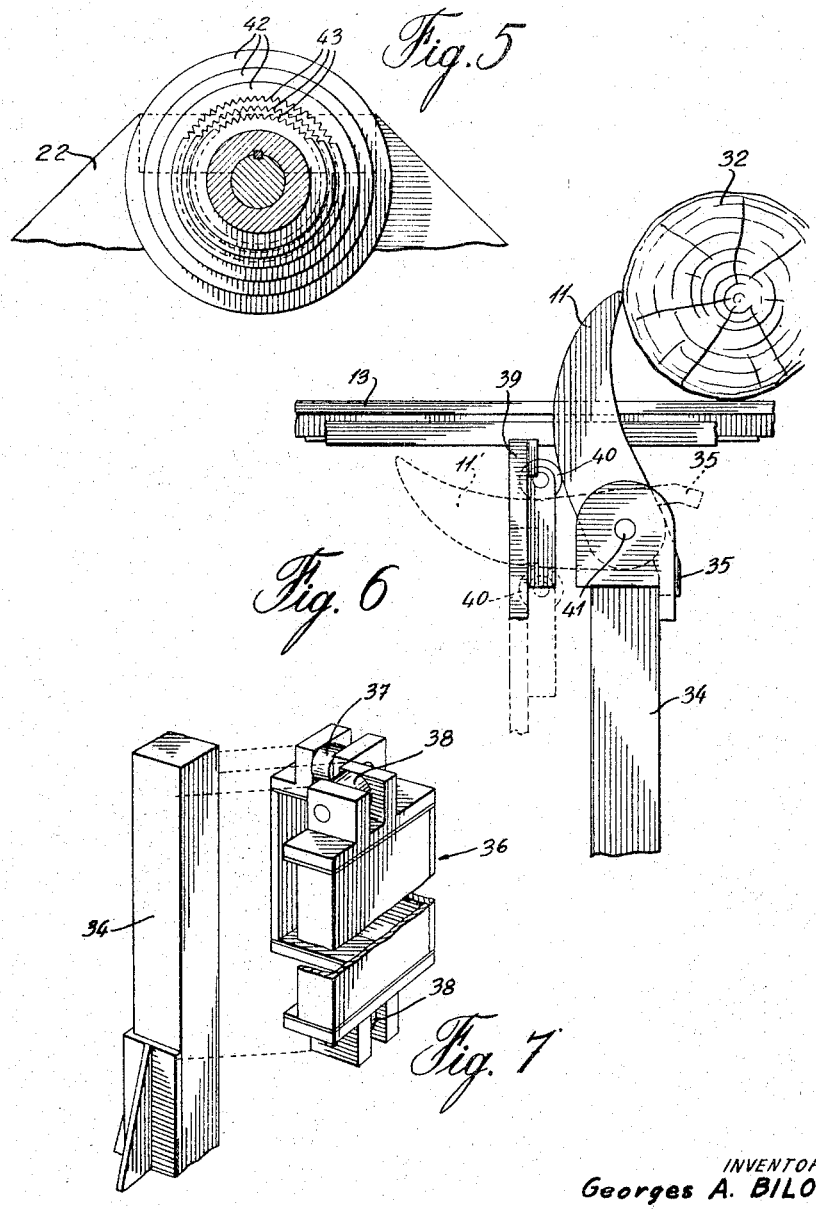

United States Patent Office 3,329,251
Patented July 4, 1967

3,329,251
LONG LOG EJECTOR
Georges A. Bilocq, Plessisville, Quebec, Canada, assignor to Forano Limitee, Plessisville, Quebec, Canada
Filed Jan. 6, 1966, Ser. No. 519,029
20 Claims. (Cl. 198—24)

The present invention relates to a device for ejecting passing articles off a conveyor. The invention is more particularly directed to an ejector for long logs passing on a conveyor.

Conveyors are well known for transporting articles. It happens that these articles must sometimes be selected for certain characteristics. In the present invention, articles are selected for one of their dimensions. The invention will be more particularly described with reference to logs which will be selected according to their length.

This application is an improvement of Canadian Patent No. 670,279 entitled "Log Aligner and Discarder" granted to G. Bilocq et al. The discharding of the logs according to this patent was not completely satisfactory in certain cases because some difficulties in ejecting the logs sideways were experimented. To facilitate the transversal movement of the logs which have to be ejected, an improved construction has been realized in order to facilitate the ejecting mechanism described in Canadian Patent No. 670,279.

The log aligning mechanism and the log feeding mechanism have not been completely described in this application and are not an essential part of the present invention. The log aligning mechanism described in Canadian Patent No. 627,048 and the log feeding and sensing mechanism described in Canadian Patent No. 654,861 to G. Bilocq are two mechanisms which may be used to co-operate with the present invention.

It is an object of the invention to provide an article ejecting device for the articles which do not have the required dimensions.

It is another object of the invention to provide a series of drums adapted to run in a direction transversal to the direction of the conveyor in order to eject unwanted articles.

It is still another object of the invention to provide ejecting drums which have various speeds corresponding to the average speed of the ejected article passing over them.

A further object of the invention consists of an article retaining means to hold back the oncoming articles while one article is being ejected.

A particular object of the invention is an article ejecting device wherein the article is a long log.

The invention consists substantially in an improvement for ejecting passing articles off a conveyor, the ejector comprising a plurality of rotatable drums located along the conveyor and below the surface of the said conveyor, the said drums having their axis parallel to the direction of the conveyor, transporting means for vertically moving the drums above the surface of the conveyor, driving means for spinning the drums, the said drums having an upper tangential direction transverse to the direction of the conveyor, actuating means for ejecting the articles passing on the drum when the drums are in a raised position.

In the drawings which illustrate embodiments of the invention,

FIG. 1 shows a perspective view of the conveyor and the ejecting device.

FIG. 2 shows a cross-sectional view of the embodiment taken along the ejecting device shown in FIG. 1.

FIG. 5 shows a cross-section of a drum.

FIG. 6 shows a log retaining device.

FIG. 7 shows carriage means for a log retaining device.

FIG. 1 shows the general assembly of a log carrying device with a log ejecting device wherein a log 1 has been transported by a belt 2 onto a log rolling table 3. In FIG. 1, the log 1 is shown resting onto spiral aligners while the far extremity of the log 1 rests against a butting belt 3a. The machine for the alignment and straightening of wood logs is described in the Canadian copending application No. 922,400, filed Feb. 3, 1965.

A log sensing means such as disclosed in the aforementioned Canadian Patent No. 654,861 may be used in this arrangement, to select the logs with the proper length. When a log passes in front of the sensing means and does not have the desired length, an information is relayed to the ejection mechanism generally respresented by 5 and the said mechanism ejects the log with the undesired length when the latter passes in front of the said mechanism.

Figure 3:
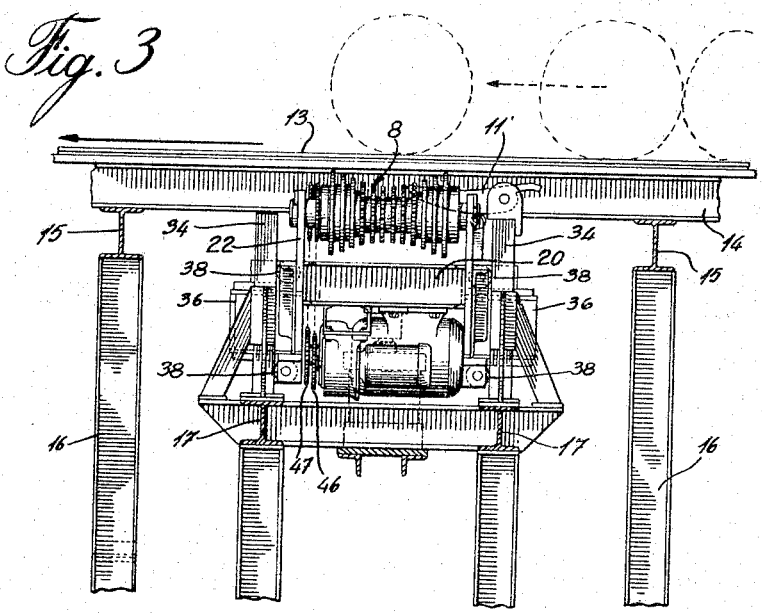
FIG. 3 shows a sectional view of the embodiment taken along an ejecting drum in a lowered position.
Figure 4:
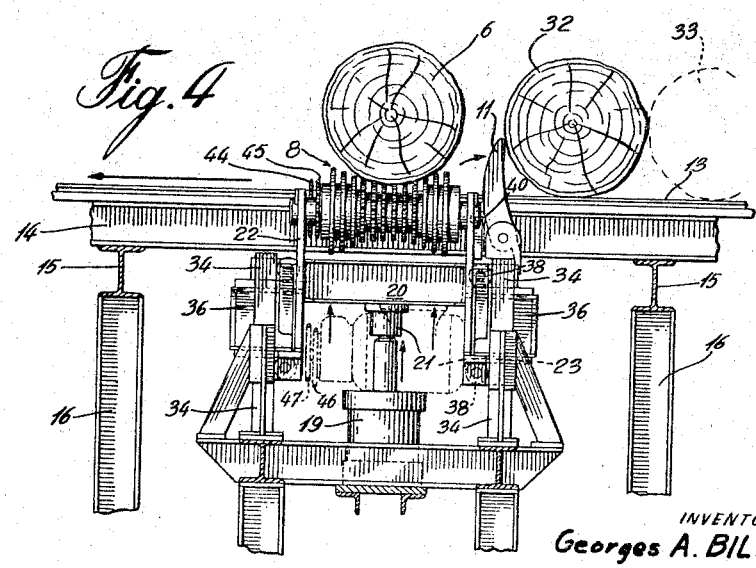
FIG. 4 shows a sectional view similar to FIG. 3 while the drum is in a raised position.

FIG. 1 shows a log 6 which did not have the desired length. Accordingly, when the log 6 passes over the transporting mechanism generally represented by drums 7, 8 and 9, the said mechanism is automatically raised in order to lift the log 6 as shown in FIGS. 1 and 4. When the drums 7, 8 and 9 and the log 6 are in their upper position, the ejection mechanism 5 acts so as to push away the log 6. When the log 6 has been pushed away, the drums 7, 8 and 9 return in their lower position as shown in FIG. 3.

Log holders 11 are foreseen to stop the oncoming logs such as indicated by 12 while the drums 7, 8 and 9 are in their upper position. The log holders 11 are raised simultaneously with the drums as shown in FIGS. 3, 4 and 6.

The general structure of the frame underneath the chain conveyors 13 and the drums 7, 8 and 9 is shown in FIG. 2. Three conveyor supporting frames 14 are held on horizontal beams 15 and supported on each side by vertical beams 16.

A secondary frame is located within the main frame constituted by the horizontal beams 15 and vertical beams 16. The secondary frame is used to vertically move the drums 7, 8 and 9 from their lower to their upper position or vice versa. A secondary horizontal frame 17 is supported onto beams 18. The frame 17 supports a hydraulic lifting cylinder 19 which vertically moves frame 20 through a piston 21. The frame 20 supports three drum holding plates 22, a motor 23 located under the frame 20 and fixed to the latter is provided to actuate the drums 7 and 8 through a gear chain 24. Another motor 25 is foreseen to actuate the drum 9 through a gear chain 26. Two motors 25 and 23 are foreseen in order to provide a speed to drum 9 different from drums 7 and 8.

FIG. 2 shows the drums 7, 8 and 9 in their lower position, that is, in a position so that their upper surface is lower than the chain conveyors 13. It may be seen from the vertical arrows A that when the frame 20 is raised, the drums 7, 8 and 9 will come in contact with the log 6. The drums may be constantly rotated by the motors 23 and 25 or may be actuated only when the said drums are raised to contact the log 6. Whether the drums are continuously or discontinuously operated, they will be spinning in the direction of the arrows B when coming in contact with the log 6. When the said contact is established, the ejector plate 27 hits the end of log 6 and the latter is projected in the direction of the arrow C.

The ejecting mechanism 5 rests on the ejector support 28. A cylinder 29 actuates a piston 30 one end of which is fixed to the ejector plate 27. An alignment rod 31 is fixed on a part of the support 28, one end of which is fixed to the ejector plate 27 in order to maintain the said ejector plate in a non-rotative position. The ejector mechanism is energized through the sensing means and is actuated when a log 6 to be ejected has been raised by the drums 7, 8 and 9.

When the drums come in contact with the log 6, they already are in rotative motion in the direction of the arrow B. They break the inertia of the log 6 and initiate a small lateral motion of the log 6. When the small motion of the log 6 has been initiated, the ejector mechanism 5 accelerates the displacement of the log 6 in the direction of the arrow C. It is seen here that the drums 7, 8 and 9 could retard the speed of the log 6 which has been pushed by the ejector mechanism. In order to prevent such a braking action, the drums are mounted in such a way that they can spin freely in the direction of the arrow B. They can positively engage the log 6 in the direction of the arrow C by the action of the motors 23 and 25. But if the log is actuated by the ejector mechanism 5 at a greater speed than their tangential speed, the drums will freely rotate at a speed equal to the linear speed of the log 6.

Considering that the log 6 will accelerate as it moves the average speed of the log when passing over the drum 9 will be greater than when passing over the drums 7 and 8. Accordingly, the motor 25 will actuate the drum 9 at a greater speed than the speed of rotation of the drums 7 and 8. The traction of the drum 9 on the log 6 will help the acceleration of the ejection of the log 6.

When the log 6 has been ejected, the drums 7, 8 and 9 return to their lower position as shown in FIG. 3.

It may be seen that logs 32, 33 following the log 6 in the raised position as shown in FIG. 4 may interfere with the ejecting mechanism if they are not held back while the log 6 is being ejected. For this purpose, log holders 11 have been foreseen to retain the logs 32, 33 and others from interfering with the log 6 which is being ejected. The log holder 11 is raised simultaneously with the drums. As shown in FIGS. 3 and 4, the log holder 11' is in an obstructing position (FIG. 3) when the drum is in its lower position and the log holder 11 (FIG. 4) serves to obstruct the logs 32, 33 when the drum is in its upper position.

The mechanism for operating the log holder 11 is more particularly seen in FIGS. 6 and 7. The log holder 11 is pivotally fixed at the top end of a post 34 and is adapted to move between two extreme positions 11 and 11'. The log holder has one heavy branch and a light branch 35. Under no constraint, the log holder will normally be in the position 11' shown in FIG. 6. A carriage 36 is adapted to move along the post 34 by means of wheels illustrated as 37 and 38. At the top of the carriage is fixed a log holder moving member which, when raised, will actuate the log holder upwardly. The moving member 39 carries a wheel 40 which will engage the edge surface of the log holder 11 and provide a pivoting action of the log holder 11 around the axis 41. The edge surface of the log holder 11 constitutes a cam surface which will provide the required actuation of the log holder according to a desired timing and motion. The carriage 36 will raise simultaneously with the frame transporting mechanism 20 and the drum holding plates 22 but the combination of the wheel 40 and the edge surface of the holder formed as a cam surface may provide a more or less rapid rotation of the log holder 11. As seen in FIG. 3, when the drum 8 is returned to the lower position, the log holder 11' fails to obstruct the oncoming logs.

The construction of the drums is particularly illustrated in FIGS. 3, 4 and 5. They are preferably constituted by a series of separated discs 42 and toothed discs 43. The diameter of the external discs is greater than the more centrally located ones. The drums have a concave exterior outline which provides a cradle shape to receive the logs to be ejected. The shape of the outline of the drum is designed in such a way that the average size logs are supported mainly by the more centrally located discs. The more centrally located discs 43 being toothed, they provide a better traction on the log when the latter has to be ejected.

As it has been indicated previously, the drums have a positive traction on the log 6 when rotating in the direction of the arrow B (see FIG. 2). The drums are mounted on their axis as a ratchet which is well known per se. They can freely rotate in the direction of the arrow B if the speed of the log 6 is greater than their tangential speed.

FIGS. 3 and 4 show sprocket wheels 44 to 47 which serve to connect the motors to the drums and actuate the same.

Although only one specific embodiment of the invention has just been described, it will be understood that various modifications may be made thereto without departing from the invention. For instance, it is obvious that the drums may be in various numbers and be driven at more than two different speeds. It is also obvious that the drums instead of consisting of a set of discs and toothed discs, may be a solid drum having spikes on its surface. The timing of the elevation and the lowering of the drums may vary from one drum to the other or may also vary in view of the sensing device and the ejecting mechanism. The scope of the invention is only to be construed from the appended claims.

I claim:

1. An improvement for ejecting passing articles off a conveyor, comprising a plurality of rotatable drums located along the conveyor and below the surface of the said conveyor, the said drums having their axis parallel to the direction of the conveyor, transporting means for vertically moving the drums above the surface of the conveyor, driving means for spinning the drums, the said drums having an upper tangential direction transverse to the direction of teh conveyor, actuating means for ejecting the articles passing on the drum when the drums are in a raised position.

2. An improvement as recited in claim 1, comprising a plurality of conveyors, the rotatable drums being located between the conveyors.

3. An improvement as recited in claim 1, comprising an article holder for holding the article following the one passing over the drums when the latter are in a raised position.

4. An improvement as recited in claim 3, wherein the article holder projects into the path of the said following article simultaneously with the raising of the drum.

5. An improvement as recited in claim 1, wherein the transporting means actuates an article holder for holding the article following the one passing over the drums, the article holder being projected in the path of the said following article simultaneously with the raising of said drums.

6. An improvement as recited in claim 1, wherein the drums which are further away from the actuating means are spinning faster than the ones closer to the said actuating means.

7. An improvement as recited in claim 1, wherein the driving means comprises two motors, a first motor for spinning the drums closer to the actuating means, a second motor for spinning the drums which are further away from the actuating means.

8. An improvement as recited in claim 7, wherein the drums which are further away spin faster than the closer ones.

9. An improvement as recited in claim 1, wherein the drums are constituted of a plurality of adjacent dicsc.

10. An improvement as recited in claim 9, wherein the centrally located discs are toothed.

11. An improvement as recited in claim 9, wherein the said discs are mounted on an axle and are freely rotatable in the direction of the ejection of the articles.

12. In a feeding mechanism, a device for pushing logs off travelling conveyor belts comprising three rotatable drums located adjacent the belts and below the surface of the said belts, the axis of said drums being parallel to the direction of travel of the conveyor belts, transporting means for vertically moving the drums up to a position above the surface of the belts, driving means for spinning the drums, the said drums having an upper tangential direction transverse to the direction of the belts, actuating means for pushing off the logs passing on the drums when the said drums are raised above the surface of the conveyor belts.

13. A device as recited in claim 12, wherein the drums are constituted of a plurality of adjacent discs.

14. A device as recited in claim 13, wherein the centrally located discs are toothed.

15. A device as recited in claim 13, wherein the said discs are mounted on an axle and are freely rotatable in the direction of the ejection of the logs.

16. A device as recited in claim 12, comprising a log holder for holding the logs following the one passing over the drums, when the latter are in a position above the surface of the belt.

17. A device as recited in claim 12, wherein the transporting means actuate a log holder for holding the logs following the one passing over the drums when the latter are in a position above the surface of the belt.

18. A device as recited in claim 12, wherein the drums which are further away from the actuating means are spinning faster than the ones closer to the said actuating means.

19. A device as recited in claim 12, wherein the driving means comprises two motors, a first motor for spinning the drums closer to the actuating means, a second motor for spinning the drums which are further away from the actuating means.

20. A device as recited in claim 19, wherein the drums which are further away spin faster than the closer ones.

References Cited
UNITED STATES PATENTS

| | | | |
|---|---|---|---|
| 3,000,519 | 9/1961 | Purnell | 214—11 |
| 3,247,963 | 4/1966 | Fehely | 209—90 X |
| 3,265,184 | 8/1966 | Franciosi | 209—90 X |

EVON C. BLANK, *Primary Examiner.*

A. C. HODGSON, *Assistant Examiner.*